United States Patent [19]

Armour

[11] 4,318,459

[45] Mar. 9, 1982

[54] FRICTION CONTROLLERS

[75] Inventor: John S. Armour, Farnborough, England

[73] Assignee: The Minister of Transport in Her Britannic Majesty's Government of the United Kingdom of Great Britain and Northern Ireland, Great Britain

[21] Appl. No.: 114,463

[22] Filed: Jan. 23, 1980

[30] Foreign Application Priority Data

Jan. 30, 1979 [GB] United Kingdom ............... 03207/79

[51] Int. Cl.³ .................................................. B60T 8/08
[52] U.S. Cl. .................................... 188/181 A; 303/1; 303/95
[58] Field of Search ....................... 188/181 A, 181 R; 303/1, 20, 95, 103, 104

[56] References Cited

U.S. PATENT DOCUMENTS 3,614,176 10/1971 Holst ........................... 188/181 R X
3,630,578 12/1971 Kaiser ................................. 303/1 X
3,750,128 7/1973 Sapir .................................. 303/95 X Primary Examiner—Duane A. Reger
Attorney, Agent, or Firm—Pollock, Vande Sande & Priddy

[57] ABSTRACT

The invention is concerned with the rapid release of frictional force which is acting to reduce relative movement between contacting surfaces, the normal actuating means being unaffected. One application is in an antilock braking system in vehicles, particularly motorcycles. A sensor monitors wheel angular velocity and when this falls below a predetermined value the sensor causes ultrasonic vibrations to be applied to brake pads effectively reducing friction without release of brake operating pressure to enable resumption of normal rotation.

The invention can also be applied to friction clutches operating in either rotary or linear senses to cause release when overloading, overspeed, etc. occurs.

7 Claims, 1 Drawing Figure

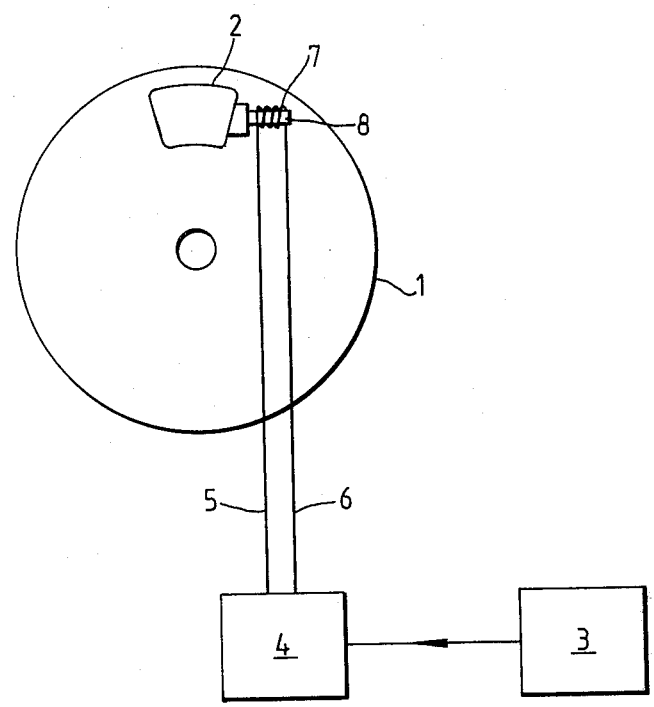

FRICTION CONTROLLERS

The invention relates to friction controllers whereby frictional forces in brakes, clutches and the like may be varied independently of the normal operating mechanism.

The invention can advantageously be applied to vehicle braking systems, especially in motorcycles, as an anti-lock device, and as a slipping clutch in mechanisms transmitting power of control movements, for example winches on cranes etc, but is not limited to these functions.

The invention provides a means of reducing frictional forces in controlled manner by utilizing the known effect of the application of ultrasonic vibration.

In wheeled vehicles, the application of brakes tends to wheel locking especially in wet or otherwise slippery conditions leading to skidding which can cause flats on the wheels of rail vehicles and loss of directional control in other cases coupled with reduction in braking effort. Wheel locking while always undesirable is particularly serious in the case of motorcycles. A recent survey has shown that motorcycles (including scooters and mopeds) account for only about 2% of the total road vehicle mileage in Britain but produce 14% of casualties in accidents, many of which occur because braking is inadequate or incorrectly applied in prevailing conditions.

Anti-lock braking systems are well known and usually comprise sensor for detecting excessive deceleration in a wheel and which is connected to release the applied brake pressure until the wheel recovers a predetermined rate of rotation, when braking is reapplied; the sequence being repeated until the wheel comes to rest on the brakes are released normally.

Such systems are in practice usually limited to brakes applied hydraulically or pneumatically since they are difficult to adapt to mechanically applied brakes.

A friction controller assembly according to the invention includes a movable member, a friction member arranged to engage the movable member and a sensor connected to apply ultrasonic vibration to at least one of the members.

In one embodiment, the movable member is a disc connected to a wheel, the friction member is a brake pad and the sensor is arranged to monitor the angular velocity of the wheel on brake application and to apply ultrasonic vibrations to the brake pad when the angular velocity falls below a predetermined value.

In another embodiment, the movable and friction members are co-acting clutch elements.

Various embodiments of the invention will now be described, by way of example only, with reference to the accompanying diagrammatic drawing which shows part of the braking system of a vehicle.

The braking system includes a metal disc 1 connected to a wheel (not shown) so as to rotate with it. A pair of brake pads 2 (one only shown), of a material having a high coefficient of friction, on either side of the disc, are connected by a caliper mechanism (not shown) whereby the pads may be urged into contact with the disc by a suitable actuating arrangement so as to apply a braking force. The actuating arrangement may be of any suitable conventional kind including the use of hydraulic, pneumatic or mechanical pressure.

A sensor 3 is connected to an ultrasonic generator 4 which is connected in turn by wires 5, 6 to the coil 7 of a magnetostrictive transducer 8 which is the contact with one of the brake pads 2. Alternatively there may be two magnetostrictive transducers, one in contact with each brake pad.

The sensor 3 is arranged to monitor the angular velocity of the vehicle wheel either directly or through the medium of the disc 1 during brake application. Thereafter if the wheel decelerates at a rate greater than a predetermined setting (usually 1 g) the sensor applies a signal to the ultrasonic generator 4 which energizes the coil 7 thus exciting the magnetostrictive transducer(s) whereby an ultrasonic vibration is applied to the brake pad or pads 2. This has the known effect of reducing the frictional force between the pad or pads and the disc 1 whereby the wheel recovers velocity at which point the sensor 3 ceases to apply the signal to the ultrasonic generator 4 and normal brake force is reapplied. This sequence of operations continues repetitively whenever there is a tendency to wheel locking until the vehicle either stops or brakes are released.

By this means the braking force applied by the pad or pads 2 is maintained to the maximum degree possible. This can be especially important during "emergency" situations when a road surface is wet and slippery, and optimum control, particularly of a motorcycle, can be maintained.

Since the system is independent of the normal brake actuating means and has no moving parts, there is a minimum time lag in its operation which is more rapid than that which might be reasonably expected where the brake actuating means are intermittently applied and released.

Various modifications consistent with the state of the art may be applied to the arrangement described. For instance the sensor 3 might include an accelerometer to measure the rate of retardation of a vehicle, the brake pads may be applied directly to a wheel eg at the rim, or conventional drum brakes may be used, while the magnetostrictive transducer may be replaced by one of the piezo-electric type which is an alternative device for converting electrical oscillation to mechanical. Ultrasonic vibrations may also be applied to the disc 1.

In another embodiment, the invention is applied to friction clutches, which may operate in either angular or linear senses, and the sensor arranged to detect other undesirable conditions such as overloading eg by strain gauge, or overspeed whereby the application of ultrasonic vibrations to one of the clutch elements allows the clutch to slip during such time as the adverse conditions are maintained.

The displacement caused by the magnetostrictive or piezo-electric transducer may be applied to the appropriate member in any desired direction. In the first embodiment described above, this is applied in the plane of rotation and along the line of instantaneous direction of rotation which is believed to be most suitable for that particular application, but any other direction either in the plane of rotation or out of it might be more advantageous according to the prevailing circumstances.

What is claimed is:

1. A friction controller assembly comprising a rotatable disc member, a friction member arranged to engage the disc member in response to actuating means, a sensor arranged to monitor the angular velocity of the disc member, and vibratory means operative independently of operation of the actuating means and controlled by said sensor for applying ultrasonic vibration to said friction member when the rate of deceleration of said disc member is in excess of a predetermined value.

2. A friction controller assembly according to claim 1 wherein said friction member comprises at least one pad of high friction material arranged selectively to contact the disc member, said vibratory means comprising a transducer disposed so as to apply ultrasonic vibration directly to the pad in response to the sensor output.

3. A friction controller assembly according to claim 2 in which the disc member is connected to a wheel and the sensor is adapted to monitor the angular velocity of the wheel.

4. A friction controller assembly according to claim 2 or claim 3 in which the transducer is of magnetostrictive type.

5. A friction controller assembly according to claim 2 or claim 3 in which the transducer is of piezo-electric type.

6. A vehicle braking system comprising a rotatable wheel, a pad arranged to apply frictional force to decelerate rotation of the wheel in response to intentional operation of a brake actuator, and means operative independently of the brake actuator for applying ultrasonic vibration automatically to the pad when the angular velocity of the wheel falls below a predetermined value during brake application by the brake actuator.

7. A vehicle braking system according to claim 6 comprising a disc connected to rotate with the wheel, said pad being connected to be urged into frictional contact with the disc, said last-named means comprising a transducer disposed to automatically apply ultrasonic vibration directly to the pad in response to the output from a sensor which is arranged to monitor the angular velocity of the wheel.

* * * * *